Sept. 10, 1946.     H. R. SEGAL     2,407,619
COWL FASTENER
Filed Feb. 14, 1945     2 Sheets-Sheet 1
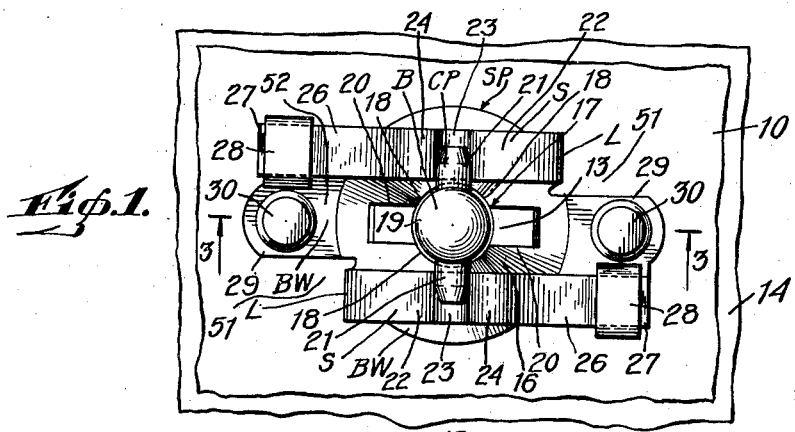
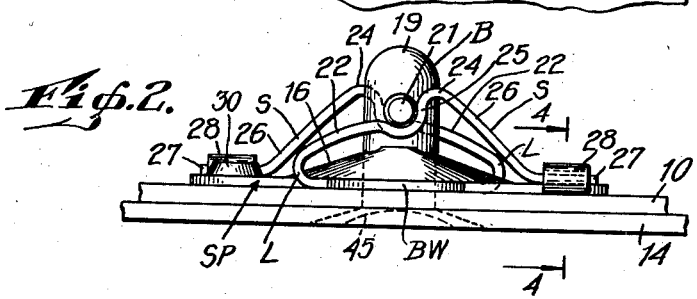
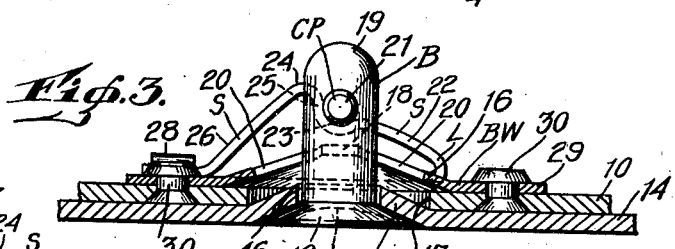
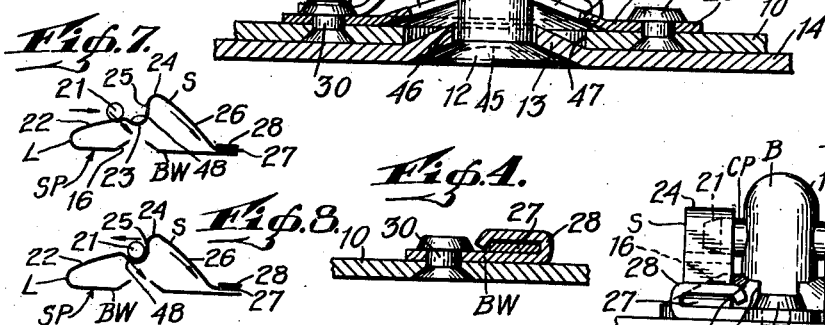
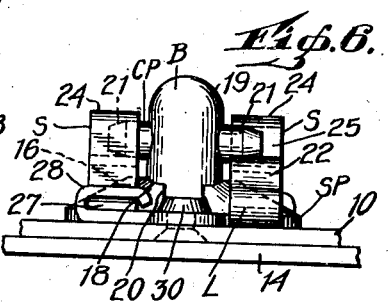
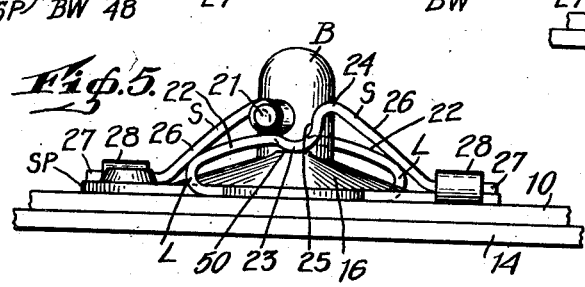
INVENTOR
H. R. SEGAL
BY
ATTORNEY

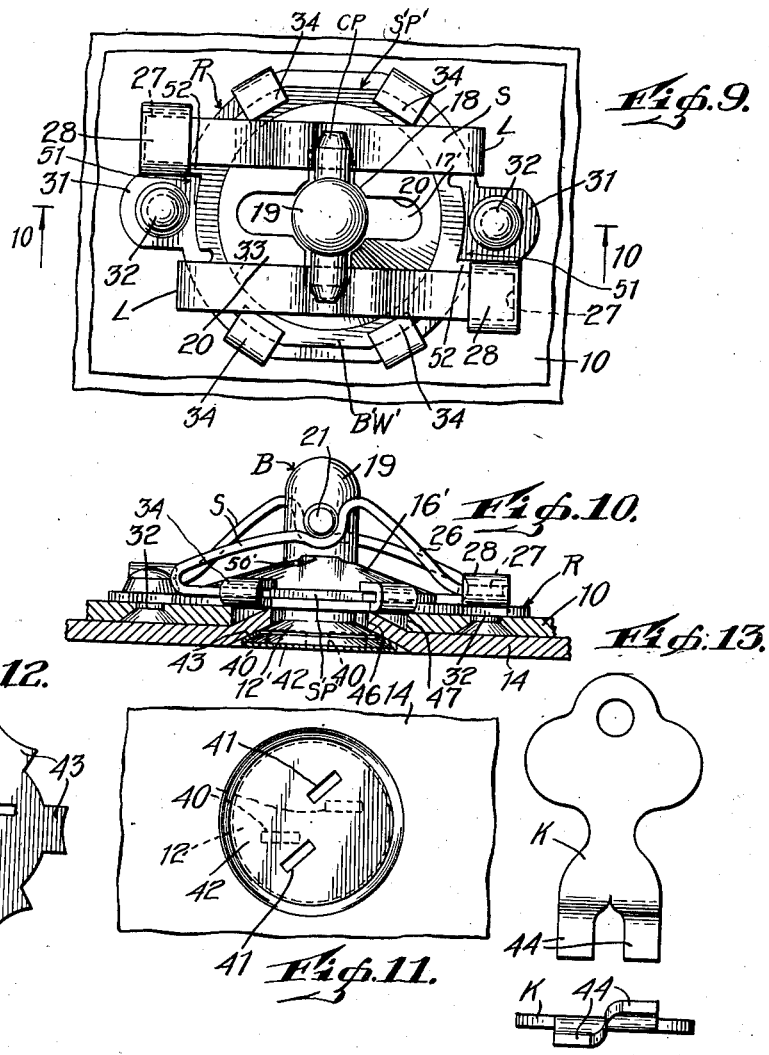

Patented Sept. 10, 1946

2,407,619

UNITED STATES PATENT OFFICE 2,407,619

COWL FASTENER

Hyman R. Segal, New York, N. Y., assignor to Helen Segal, New York, N. Y.

Application February 14, 1945, Serial No. 577,841

9 Claims. (Cl. 24—221)

This invention relates to improved and serviceable cowl fastening means and the object thereof is realized in the provision of a novel cowl fastener wherein an outside plate member rotatably carries a bolt having a cross pin adapted to be removably snapped on transversely spaced resilient straps integral with and extending longitudinally of a relatively thin sheet metal spring plate desirably retained on an inside plate member to which the outside plate member is disengageably clamped, the spaced straps characterizing loop means with the bottom wall of the spring plate and having free portions disposed at alternate opposite ends of the bottom wall and retained slidably in adjacent but appropriate bearing means also integral with the bottom wall, the arrangement being such that each of the resilient and relatively wide straps include spaced and alined keeper means to removably retain the cross pin in a desired elevated position for holding the outside plate member in the desired clamped relation against the inside plate member.

The invention has as another object the provision of a cowl fastener wherein a greater torque is required to disengage the cross pin of the rotatable bolt from the keeper means of the spaced straps than the torque required to operate the rotatable bolt for actuating the cross pin against the resistance of the spaced straps to interlock with the keeper means. By such action, the cross pin may thus be readily secured to the base plate but it is desirably resistant to accidental dislodgement therefrom.

Other important functional and structural features of the invention will appear from the following detailed description considered with the teachings of the accompanying drawings wherein:

Fig. 1 is an inside plan view of the cowl fastener according to my invention.

Fig. 2 is a front elevational view of Fig. 1.

Fig. 3 is a longitudinal and sectional view on the line 3—3 of Fig. 1.

Fig. 4 is a transverse sectional view on the line 4—4 of Fig. 2.

Fig. 5 is a view similar to Fig. 2 however illustrating the cross pin of the rotatable bolt about to be unlocked from the keeper means.

Fig. 6 is an end view of Fig. 2 illustrating the cross pin of the bolt interlocked with the transversely alined concaved portions or keeper means of the transversely spaced resilient straps.

Fig. 7 is a schematic view illustrating the action of the cross pin on the strap means on rotation of the bolt to its locking position.

Fig. 8 is a view similar to Fig. 7 but showing the disposition of the strap means to preclude accidental dislodgement of the cross pin from its interlocking relation with the keeper means.

Fig. 9 is a view similar to Fig. 1 but illustrating the spring plate movably held on a fixed retaining plate.

Fig. 10 is a sectional view on the line 10—10 of Fig. 9.

Fig. 11 is a fragmentary front view of Fig. 10.

Fig. 12 is a plan view of key positioning guard mounted on the rotatable bolt.

Fig. 13 shows a front view of a key utilized to operate the bolt illustrated in Figs. 9 and 10, and Fig. 14 is an end view of the key shown in Fig. 13.

In all of the embodiments disclosed the cowl fastener comprises a spring plate broadly denoted SP desirably secured to an inside plate member 10, and a rotatable bolt B having an enlarged slotted head 12 rotatably guided in the countersunk portion or bearing 13 of the outside panel or plate member 14.

According to the invention, the one piece resilient sheet metal looped shaped spring plate or keeper broadly denoted SP is characterized by a bottom wall or base plate BW having a hollow boss 16 interrupted by the so called butterfly shaped slot generally designated 17 comprising enlarged portions or notches 18 adapted to removably receive shank 19 of the bolt B and the communicating and alined laterally extending constricted portions or gaps 20 to desirably receive the overhanging portions 21 of the cross pin CP driven into shank 19.

Integral with the bottom wall or base plate BW but extending from alternate and opposite ends thereof are the transversely and relatively wide spaced straps S each of which comprises a loop shaped portion L, an inclined limb 22 merging with a concaved portion or stop keeper 23, a reflexed portion 24 characterizing an abutment or shoulder 25 merging with the keeper means 23, and the downwardly and outwardly inclined limb 26 merging with the offset terminal 27 slidably retained in an inwardly turned lug 28 characterizing a bearing or socket integral with the bottom wall BW of the spring plate SP.

In the form according to Figs. 1-6 inclusive, the bottom wall BW is provided with ears 29 which are secured to the inside plate member or carrier 10 by suitable pins or rivets 30 while in the embodiment illustrated in Figs. 9 and 10 the spring plate S'P' is slidably mounted on a retainer generally denoted R provided with ears 31 fastened to the inside carrier plate 10 by the rivets 32. Specifically the spring plate S'P' is mounted to slightly float or slide on the substantially ring shaped rim or annular member 33 of the retainer R which includes a plurality of turned over lugs 34 to slidably retain the bottom wall B'W' in place.

In Figs. 9 and 10 the beveled head 12' of the bolt is provided with alined recesses 40 adapted to register with correspondingly spaced notches 41 of a collar 42 rotatably retained on the beveled head 12' by the inclined lugs 43.

The key K is provided with the offset terminals 44 adapted to be inserted into notches 41 of the collar 42 and the latter may be rotated relative to the beveled head 12' whereupon the terminals 44 may enter the recesses 40, and thereafter the key is utilized to rotate the bolt. Of course no special type of key as illustrated in Figs. 9–14 need be used and under such circumstances the head of the bolt may be provided with a single diametrically disposed slot 45 as in the form shown in Figs. 2 and 3.

The relatively wide resilient straps S are normally spaced from the frusto conical shaped boss 16' which serves as stop means to limit the displacement of the keeper means 23.

With the one piece spring plate SP fastened directly to the carrier or inside plate member 10 as in Figs. 1–3 or, as in the form shown in Figs. 9 and 10, slidably disposed on the ring shaped retainer R which in turn is fastened by rivets 32 to the carrier or carrier plate 10, the expanded notches 18 of the butterfly shaped slot 17 are in alinement with opening 46 in the bearing 13 and the narrow slots 20 are ready to removably receive the cross pin CP which is thus brought between the spaced straps S. Thereafter upon rotation of the bolt B the overhanging terminals 21 of the cross pin first engage the inclined limbs 22 of these straps, thus depressing the latter, and by such action, the keepers 23 are depressed, and the opposing and alternate limbs 26 cause the slidable terminals 27 to project slightly beyond the guide means or bearings 28 (Fig. 7), that is, to shift outwardly until terminals 21 of the cross pin reach the keeper means 23, at which time the latter interlocks with these terminals 21 and under pressure due to the inherent retractive resilient action of the straps S. If therefore the cross pin is interlocked with the straps the latter urges or has a tendency to urge the cross pin away from the carrier 10 and consequently the head 12 of the bolt urges the bearing 13 in a direction inwardly of the bearing receiving opening 47 in the carrier 10, causing the outer plate member to be desirably clamped against the carrier 10.

In all of the embodiments disclosed, when the cross pin is interlocked with the keeper of the resilient straps S, a greater torque is required to unlock or remove the pin therefrom than that required in shifting the pin to its interlocking relation therewith in that the terminals 21 of the cross pin upon rotation of the bolt, to shift the terminals 21 clockwise (Fig. 8) act against or are resisted by the inclined cam portions 48 of the keepers 23, thus causing the movable but retained lugs or terminals 27 of the straps to retract slightly, or in other words, once the cross pin becomes interlocked with the alined keeper means 23, it will stay interlocked until the bolt has been deliberately rotated in a desired direction upon insertion of a suitable tool in the diametrically disposed slot 45 as in the case of the form illustrated in Figs. 1–6 or upon the use of the key illustrated in Figs. 13 and 14 for the insertion into the collar of Fig. 12 to aline the openings 41 of the rotatable collar 42 with the notches 40 after which the bolt may be rotated to engage or disengage the cross pin with or from the resilient straps S. Of course where the cross pin is interlocked with the keepers the outer plate member 14 is firmly clamped against the carrier 10 and upon disengagement of the cross pin from the strap S the latter retracts and the cross pin may be projected through the alined openings 18, and thereafter the bolt is withdrawn from the opening 47 and arranged on the bearing 13. The cross pin is prevented from passing through opening 46 of the bearing 13 in that the length of the pin is larger than this opening.

In actual practice, the thickness of plate members 10 and 14 vary in tolerances and by the provision of the longitudinally displaceable and resilient straps S, these tolerances may be compensated for in that the keepers are readily depressible upon the operation of the cross pin and automatically retractible to interlock therewith. This is true in connection with all of the embodiments disclosed. In Figs. 9 and 10, the floating relation of the spring plate S'P' allows for quick alinement thereof relative to the carrier 10 upon insertion of the cross pin CP through the butterfly slot 17 of the boss 16' whose top portion 50, characterizes stop means to limit downward deflection of the straps (Fig. 5).

In all of the forms disclosed, the spaced straps S of course are partly inclined and in part arcuate and the portions as 23 and 24, may be characterized as reflexed means although it should be appreciated that the bottom wall BW may be said to embody alternate corner recesses or recess means 51, thus providing alternately arranged projecting portions 52 each integrally embodying a bearing 28. For purposes of specification the spring plate SP may be considered as a keeper for removably interlocking with the cross pin of the rotatable bolt.

Various changes may be made in details of construction and arrangement of parts without departing from the spirit of the invention or sacrificing any of the advantages therein.

I claim:

1. A keeper adapted to be utilized with a bolt having a cross pin, said keeper comprising a one piece spring plate including a bottom wall having a boss embodying an elongated slot including an enlarged portion and longitudinally disposed and alined restricted portions communicating with said enlarged portion, loop portions disposed at substantially alternate portions of said spring plate, spaced straps integral with said loop portions and extending in opposite directions and overlying said boss and comprising concaved means and including terminal means, bearing means on said bottom wall for slidably guiding said terminal means, said enlarged portion adapted to removably and rotatably receive said bolt and said alined restricted portions adapted to removably receive said cross pin for removably engaging the latter with said straps and for tensioning said straps prior to interlocking said cross pin with said concaved means, and stop means on said straps to limit rotational displacement of said cross pin.

2. A keeper adapted to be utilized with a bolt having a cross pin, said keeper comprising a one piece spring plate including a bottom wall having a boss embodying an elongated slot including an enlarged portion and longitudinally disposed and alined restricted portions communicating with said enlarged portion, loop portions disposed at substantially alternate corners of said spring plate, spaced and resilient straps integral with said loop portions and extending in opposite directions and overlying said boss and comprising concaved means and including terminal means and having inclined limbs integral with said loop portions and concaved means, bearing means on said bottom wall for slidably guiding said terminal means, said enlarged portion adapted to removably receive said bolt and said alined restricted portions adapted to removably receive said cross pin for removably engaging the latter with said straps and for tensioning said straps prior to interlocking said cross pin with said concaved means, and stop means on said straps to limit rotational displacement of said cross pin.

3. A keeper adapted to be utilized with a bolt having a cross pin, said keeper comprising a one piece spring plate including a bottom wall having a boss embodying an elongated slot including an enlarged portion and longitudinally disposed and alined restricted portions communicating with said enlarged portion, loop portions disposed at substantially alternate portions of said spring plate, spaced and resilient straps in part inclined and in part arcuate and integral with said loop portions and extending in opposite directions longitudinally of said bottom wall and overlying said boss and comprising alined concaved means and including terminal means offset relative to the bodies of said straps, bearing means on said bottom wall for slidably guiding said terminal means, said enlarged portion adapted to removably and rotatably receive said bolt and said alined restricted portions adapted to removably receive said cross pin for removably engaging the latter with said straps and for tensioning said straps prior to interlocking said cross pin with said concaved means, and inclined stop means on said straps to limit rotational displacement of said cross pin.

4. A keeper adapted to be utilized with a bolt having a cross pin, said keeper comprising a one piece spring plate including a bottom wall having a boss embodying an elongated slot including an enlarged portion and longitudinally disposed and alined restricted portions communicating with said enlarged portion, loop portions disposed at substantially alternate corners of said spring plate, transversely spaced and resilient straps disposed longitudinally of said bottom wall and integral with said loop portions and extending in opposite directions and overlying said boss and comprising alined concaved means and including terminal means, bearing means disposed at alternate corners of said bottom wall and alternate to said first mentioned corners for slidably guiding said terminal means, said enlarged portion adapted to removably and rotatably receive said bolt and said alined restricted portions adapted to removably receive said cross pin for removably engaging the latter with said straps and for tensioning said straps prior to interlocking said cross pin with said concaved means, and stop means on said straps to limit rotational displacement of said cross pin.

5. A keeper adapted to be utilized with a bolt having a cross pin, said keeper comprising a one piece spring plate including a bottom wall having a boss embodying an elongated slot including an enlarged portion and longitudinally disposed and alined restricted portions communicating with said enlarged portion, loop portions disposed at substantially alternate corners of said spring plate, resilient and relatively wide and spaced straps integral with said loop portions and extending in opposite directions longitudinally of said bottom wall and spatially overlying said boss and comprising intermediately arranged and alined concaved means and including terminal means, bearing means disposed alternately relative to said corners and integral with said bottom wall for slidably guiding said terminal means, said enlarged portion adapted to be removably and rotatably receive said bolt and said alined restricted portions adapted to removably receive said cross pin for removably engaging the latter with said straps and for tensioning said straps prior to interlocking said cross pin with said concaved means, and inclined stop means integral with said straps to limit rotational displacement of said cross pin.

6. A keeper, for use with a bolt having a cross pin; comprising, a bottom wall having a boss including an elongated slot having a relatively enlarged central portion and communicating restricted portions, resilient straps spaced transversely of said bottom wall and in part vertically spaced from and overlying said boss and having loop portions integral with said bottom wall and disposed at alternate corner portions of the latter, said spaced straps including offset terminals extending in opposite directions but contiguous to and overlying said bottom wall, bearing means extending from said bottom wall and disposed alternately with respect to said alternate corner portions for slidably retaining said terminal means, and alined arcuate means integral with said spaced straps to removably interlock with said cross pin.

7. A keeper, for use with a bolt having a cross pin; comprising, a bottom wall having a boss including a relatively elongated slot having a relatively enlarged central portion and communicating restricted portions, resilient straps spaced transversely of said bottom wall and disposed longitudinally of the latter and vertically spaced from and overlying said boss and having loop portions integral with said bottom wall and disposed at alternate corner portions of the latter, said spaced straps including substantially horizontally arranged terminals extending in opposite directions but contiguous to and overlying said bottom wall, bearing means integral with said bottom wall and disposed alternately with respect to said alternate corner portions for movably retaining said terminal means, and alined arcuate means integral with said straps to removably interlock with said cross pin.

8. A keeper, for use with a bolt having a cross pin; comprising, a bottom wall including an elongated slot having a relatively enlarged central portion and communicating restricted portions, resilient straps spaced transversely of said bottom wall and disposed longitudinally of the latter and vertically spaced from and partially overlying said boss and having loop portions integral with said bottom wall and disposed at alternate corner portions of the latter, said spaced straps including inclined limbs and terminals offset relative to said limbs and extending in opposite direction but contiguous to and overlying said bottom wall, bearing means integral with said bottom wall and disposed alternately with respect to said alternate corner portions for slidably retaining said terminal means, and alined arcuate means intermediately of said straps for removably interlocking with said cross pin.

9. A keeper, for use with a bolt having a cross pin, comprising, a bottom wall having a boss including an elongated slot having a relatively enlarged central portion and communicating restricted portions, resilient straps spaced transversely of said bottom wall and disposed longitudinally of the latter and vertically spaced from and partially overlying said boss and having loop portions integral with said bottom wall and disposed at alternate corner portions of the latter, said spaced straps including inclined limbs and terminals offset relative to said limbs and extending in opposite directions but contiguous to and overlying said bottom wall, bearing means integral with said bottom wall and disposed alternately with respect to said alternate corner portions for retaining said terminal means, alined arcuate means integral with said straps for removably interlocking with said cross pin, and a retainer comprising spaced lugs for loosely guiding said bottom wall.

HYMAN R. SEGAL.